(12) United States Patent
Hastings et al.

(10) Patent No.: US 10,089,384 B2
(45) Date of Patent: Oct. 2, 2018

(54) MACHINE LEARNING-DERIVED UNIVERSAL CONNECTOR

(71) Applicant: CA, INC., New York, NY (US)

(72) Inventors: Nathan Allin Hastings, Glen Iris (AU); Steven Cornelis Versteeg, Ivanhoe (AU); John Sinclair Bird, Ringwood North (AU); Xien Yao, Doncaster (AU)

(73) Assignee: CA, INC., New York, NY (US)

( * ) Notice: Subject to any disclaimer, the term of this patent is extended or adjusted under 35 U.S.C. 154(b) by 551 days.

(21) Appl. No.: 14/656,158

(22) Filed: Mar. 12, 2015

(65) Prior Publication Data

US 2016/0267170 A1    Sep. 15, 2016

(51) Int. Cl.
*G06F 7/00* (2006.01)
*G06F 17/30* (2006.01)
*H04L 29/08* (2006.01)
*G06N 5/04* (2006.01)

(52) U.S. Cl.
CPC ......... *G06F 17/30601* (2013.01); *G06N 5/04* (2013.01); *H04L 67/10* (2013.01); *H04L 67/2819* (2013.01)

(58) Field of Classification Search
CPC .............................................. G06F 17/30601
USPC ....................................................... 707/737
See application file for complete search history.

(56) References Cited

U.S. PATENT DOCUMENTS

| | | | |
|---|---|---|---|
| 6,247,059 B1 * | 6/2001 | Johnson | H04L 12/1868 370/390 |
| 7,487,456 B2 * | 2/2009 | Brooke | G06Q 10/109 715/748 |
| 8,010,614 B1 * | 8/2011 | Musat | H04L 51/12 709/206 |
| 8,170,966 B1 * | 5/2012 | Musat | H04L 51/12 706/14 |
| 2006/0150196 A1 * | 7/2006 | Herrmann | G06F 9/546 719/314 |
| 2007/0260750 A1 | 11/2007 | Feied et al. | |
| 2007/0288935 A1 * | 12/2007 | Tannenbaum | G06F 9/5072 719/319 |
| 2009/0177484 A1 * | 7/2009 | Davis | G06Q 30/02 705/346 |
| 2009/0327864 A1 * | 12/2009 | Bogestam | H04L 67/02 715/234 |
| 2010/0257117 A1 * | 10/2010 | Shvadron | G06F 17/30616 705/36 R |

(Continued)

*Primary Examiner* — Cheyne D Ly
(74) *Attorney, Agent, or Firm* — Sage Patent Group

(57) ABSTRACT

In a computer-implemented method for endpoint management, a plurality of messages communicated between a target endpoint and a client are recorded, in a computer-readable memory. Ones of the messages are clustered into respective groups, where the respective groups correspond to respective operation types of the ones of the messages included therein. For the respective operation types, respective message structures used by the target endpoint are determined based on commonalities among the ones of the messages of the respective groups corresponding to the operation types. For one of the respective operation types, a request to the target endpoint is generated in accordance with a corresponding one of the respective message structures used by the target endpoint. Related computer systems and computer program products are also discussed.

14 Claims, 6 Drawing Sheets

(56) References Cited

U.S. PATENT DOCUMENTS

2012/0158855 A1\* 6/2012 Loofbourrow .......... H04L 51/22
709/206

\* cited by examiner

MACHINE LEARNING-DERIVED UNIVERSAL CONNECTOR

BACKGROUND

Various embodiments described herein relate to computer systems, methods and program products and, more particularly, to virtualized computer systems, methods and computer program products.

Modern enterprise software environments may integrate a large number of software systems to facilitate complex business processes. Many of these software systems may interact with and/or rely on services provided by other systems (e.g., third-party systems or services) in order to perform their functionalities or otherwise fulfill their responsibilities, and thus, can be referred to as "systems of systems." For example, some enterprise-grade identity management suites may support management and provisioning of users, identities, and roles in large organizations across a spectrum of different endpoint systems. Such systems can be deployed into large organizations or corporations, such as banks and telecommunications providers, and may be used to manage the digital identities of personnel and to control access of their vast and distributed computational resources and services.

In particular, identity management products can automate the process of granting and verifying application access based on each user's relationship and role with the organization (including but not limited to employees, administrators, contractors, customers or business partners), which can improve information technology (IT) flexibility and/or operational efficiencies. Such identity management products can also reduce security risks by on-boarding new users faster, and/or by ensuring users are only granted access that is appropriate to their function.

As noted above, one use case for identity management products is the ability to provision access to disparate endpoint systems. For example, an identity may be associated with a single authoritative user stored in a corporate store (such as Microsoft Active Directory), but may be associated with numerous accounts in other managed endpoints such as SAP®, PeopleSoft®, Google Apps®, etc. Provisioning to these endpoints is typically the responsibility of a network component referred to as the Connector Server (CS). The Connector Server may utilize a number of connectors, each of which may be responsible for a different endpoint type. These connectors can thus act as a bridge to convert requests and data from a common format used within the Connector Server into the specific protocol(s) or client libraries used within or otherwise understandable by the endpoint.

BRIEF SUMMARY

According to some embodiments, in a computer-implemented method for endpoint management, a plurality of messages communicated between a target endpoint and a client are recorded, in a computer-readable memory. Ones of the messages are clustered into respective groups, where the respective groups correspond to respective operation types of the ones of the messages included therein. For the respective operation types, respective message structures used by the target endpoint are determined based on commonalities among the ones of the messages of the respective groups corresponding to the operation types. For one of the respective operation types, a request to the target endpoint is generated in accordance with a corresponding one of the respective message structures used by the target endpoint. The recording, the clustering, the determining, and the generating comprise operations performed by a processor.

In some embodiments, in determining the respective message structures for the respective operation types, constant and variable sections of the respective message structures may be identified for the respective operation types. The constant and variable sections of the respective message structures may be identified based on the commonalities among the ones of the messages of the respective groups corresponding to the respective operation types, and without knowledge or otherwise independent of a communications protocol used by the target endpoint.

In some embodiments, the ones of the messages of the respective groups may include requests to the target endpoint, and/or requests to the target endpoint and responses to the requests. In identifying the constant and variable sections of the respective message structures for the respective operation types, the requests of the respective groups may be aligned according to respective positions thereof, and the constant and variable sections of the respective message structures for the respective operation types may be identified based on a frequency of occurrence of the commonalities at the respective positions of the requests of the respective groups corresponding thereto indicated by the aligning.

In some embodiments, the commonalities may be common characters that are present at the respective positions of ones of the requests of the respective groups. Based on the respective message structures for the respective operation types, respective request prototypes may be created for the respective operation types. The request prototypes may include fields representing the constant and variable sections of the respective message structures used by the target endpoint for the respective operation types. The fields representing the constant sections of the respective request prototypes may include corresponding ones of the common characters.

In some embodiments, in generating the request to the target endpoint for the one of the respective operation types, one of the request prototypes corresponding to the one of the operation types may be selected. For the one of the request prototypes that was selected, ones of the fields representing the variable sections may be populated with data from an external database to generate the request to the target endpoint.

In some embodiments, the data may correspond to a user identity in a system employing a message structure different from the respective message structures used by the target endpoint. The request may associate the user identity with an account of the target the endpoint. For example, the request may be used to provision a user identity on a first system for use on the target endpoint.

In some embodiments, the request to the target endpoint may be generated without or otherwise independent of a connector component that is specific to the target endpoint and/or a communications protocol used thereby. In some embodiments, the communications protocol used by the target endpoint may not be a generic protocol.

In some embodiments, the ones of the messages may be clustered into the respective groups responsive to receiving user input indicating the respective operation types of the ones of the messages.

In some embodiments, the ones of the messages may be clustered into the respective groups based on similarities therebetween calculated using a distance function, and then the respective groups may be classified as corresponding to the respective operation types responsive to receiving user input indicative of the correspondence between the respective groups and the respective operation types.

According to further embodiments, a computer system includes a processor, and a memory coupled to the processor. The memory includes computer readable program code embodied therein that, when executed by the processor, causes the processor to record, in a computer-readable memory, a plurality of messages communicated between a target endpoint and a client, and cluster ones of the messages into respective groups. The respective groups correspond to respective operation types of the ones of the messages included in the respective groups. The memory further includes computer readable program code embodied therein that, when executed by the processor, causes the processor to determine, for the respective operation types, respective message structures used by the target endpoint based on commonalities among the ones of the messages of the respective groups corresponding to the respective operation types, and generate, for one of the respective operation types, a request to the target endpoint in accordance with a corresponding one of the respective message structures used by the target endpoint.

According to still further embodiments, a computer program product includes a computer readable storage medium having computer readable program code embodied in the medium. The computer readable program code includes computer readable code to record, in a computer-readable memory, a plurality of messages communicated between a target endpoint and a client, and computer readable code to cluster ones of the messages into respective groups. The respective groups correspond to respective operation types of the ones of the messages included therein. The computer readable program code further includes computer readable code to determine, for the respective operation types, respective message structures used by the target endpoint based on commonalities among the ones of the messages of the respective groups corresponding to the respective operation types, and computer readable code to generate, for one of the respective operation types, a request to the target endpoint in accordance with a corresponding one of the respective message structures used by the target endpoint.

It is noted that aspects described herein with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
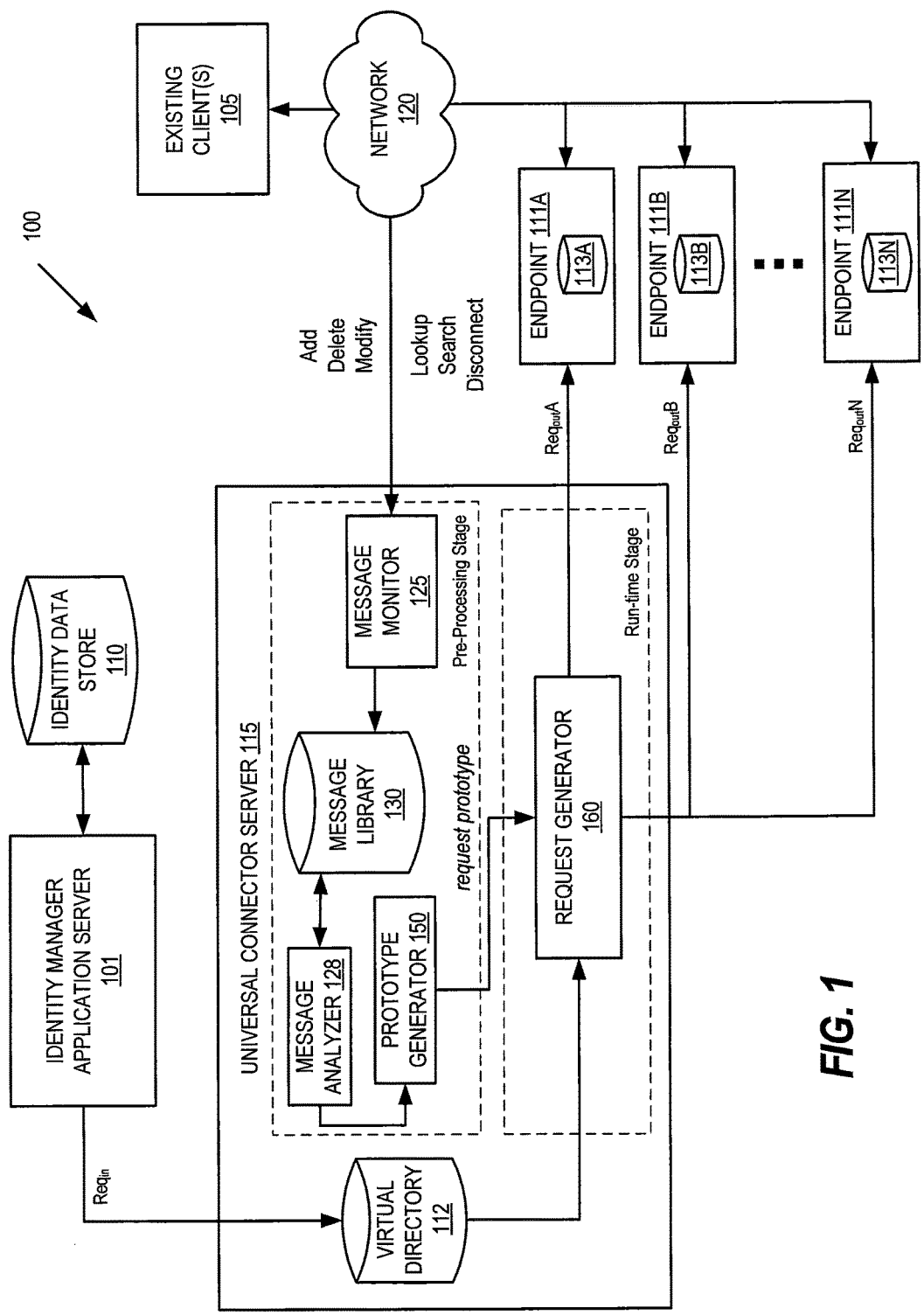
FIG. 1 is a block diagram of a computing system or environment employing a universal connector for identity management in accordance with some embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As described herein, a computing system or environment may include one or more hosts, operating systems, peripherals, and/or applications. Machines in a same computing system or environment may have shared memory or resources, may be associated with the same or different hardware platforms, and/or may be located in the same or different physical locations. Computing systems/environments described herein may refer to a virtualized environment (such as a cloud environment) and/or a physical environment.

As used herein, an endpoint may refer to a specific installation of a platform or application, such as Active Directory or Microsoft Exchange, which may communicate with an identity manager to synchronize information. An endpoint is typically managed by a connector server using a specific connector, which may refer to software that enables communication between a server and an endpoint system. Connectors are typically responsible for representing each of the object classes in an endpoint in a consistent manner. For example, connectors may translate add, modify, delete, rename, and search LDAP operations on objects into corresponding actions against the endpoint system.

Some embodiments of the present disclosure may arise from realization that a cost of supporting new managed endpoint types can include significant overhead in creating new connectors for the respective endpoint types. A connector may include at least two elements: the protocol and the data schema. In many cases, providing the data schema for the connector may not be problematic, as attributes are typically described in a data driven manner that can allow for mapping between different names/types using metadata at run time. Providing the protocol for the connector, however, may typically require coding unless the endpoint supports a generic protocol such as LDAP (Lightweight Directory Access Protocol) or SQL (Structured Query Language). Such additional coding can be prohibitively expensive and/or impractical in a time constrained situation, such as a sale's proof of concept (POC).

Accordingly, embodiments of the present disclosure can provide endpoint management systems, methods, and computer program products that allow for the addition of new endpoint types without requiring additional coding operations and/or the use of endpoint-specific connectors or protocols. In particular, some embodiments of the present disclosure provide a "universal connector" that is configured to record and store network traffic (including request messages and/or response messages; also referred to herein as message transactions) communicated between an existing client and a target endpoint, classify the recorded messages by operation type, and thus learn or otherwise determine message structures of the communications protocol(s) used by the target endpoint based on the classification of the recorded messages. In particular, once a sufficiently large collection of messages are recorded, the messages can be analyzed to determine commonalities in structure and/or format, which may be indicative of constant and variable segments or sections of the message structures used by the target endpoint for each operation type. Once determined, the message structures can be used to produce templates that can be populated with mapped attributes to generate requests having the structure/format expected by the target endpoint.

Identity management in accordance with embodiments of the present disclosure may thus offer advantages in that additional coding operations and/or the use of endpoint-specific protocols may not be required to add new endpoint types. Furthermore, embodiments of the present disclosure may be language agnostic. For example, a universal connector as described herein may be implemented as a Java application, even though an endpoint vendor may supply C/C++ client libraries.

FIG. 1 is a block diagram illustrating a computing system or environment employing a universal connector for protocol-independent endpoint management in accordance with some embodiments of the present disclosure. Referring now to FIG. 1, the environment 100 includes a plurality of endpoints 111A, 111B . . . 111N, at least one existing client 105 of the endpoints 111A, 111B . . . 111N, and a universal connector server 115. The endpoints 111A, 111B . . . 111N may be implemented on one or more servers, and may provide one or more software services upon which the existing client(s) 105 depend or otherwise interact to fulfill responsibilities. The environment 100 further includes an identity manager application server 101 and an identity data store 110.

The identity data store 110 may include user identity data for a plurality of users associated with a particular system or server, which may be managed by the identity manager application server 101. The identity management application server 101 may be tasked with provisioning one or more of the user identities stored in the data store 110 for use with accounts in one or more of the endpoint systems 111A, 111B, . . . 111N. The use of a single identity for a given user across multiple systems may ease tasks for administrators and users, for example, by reducing complexity with respect to access monitoring and verification, by allowing an organization control over the granting of excessive privileges, and/or by allowing for the addition of services for both internal users and by customers.

The universal connector server 115 is configured to enable communication between the identity manager application server 101 and one or more of the endpoints 111A, 111B . . . 111N. However, rather than converting requests and data from a common format (e.g., used within a conventional connector) into the format expected by a target endpoint, the universal connector server 115 is configured to infer or otherwise determine the message structures, per operation type, used by one or more of the endpoints 111A, 111B, . . . 111N by observing and analyzing prior communications therewith. The universal connector server 115 can thus automatically generate requests and data in accordance with the specific protocol(s) or client libraries used within or otherwise understandable by the endpoints 111A, 111B . . . 111N, without prior/preprogrammed knowledge, additional coding, or otherwise independent of the particular communications protocols used by the endpoints 111A, 111B . . . 111N.

In the embodiment shown in FIG. 1, the universal connector server 115 includes a virtual directory 112, a message monitor 125, a message analyzer 128, a message library 130, a prototype generator 150, and a request generator 160. The virtual directory 112 provides an access point for the identity management application server 101. For example, the virtual directory may be a lightweight abstraction layer that resides between client applications and disparate types of identity-data repositories, such as proprietary and standard directories, databases, web services, and applications. The virtual directory 112 receives requests $Req_{in}$ from the identity manager application server 101 and directs the requests $Req_{in}$ to the request generator 160 by abstracting and virtualizing data. The virtual directory 112 may integrate identity data from multiple heterogeneous identity data stores 110 and may present the identity data as though it were from one source. The virtual directory 112 may thus consolidate user identity and/or other data stored in a distributed computing environment.

The message library 130 stores a set of messages (including requests and/or associated responses) sampled from prior communications with (i.e., to and/or from) the existing client(s) 105 and the target endpoints 111A, 111B, . . . 111N by the message monitor 125. The message analyzer 128 clusters similar ones of the messages communicated with a particular target endpoint 111A, 111B, . . . , or 111N into respective groups, where the similar messages in each group may correspond to a same operation type. The message analyzer 128 further determines a message structure used by the particular target endpoint for one or more of the operation types, based on commonalities among the messages of each group. The response generator 160 thereby generates a request to the target endpoint for a particular operation type in accordance with the determined message structure used by the particular target endpoint (for example, by populating a template created by the prototype generator 150), as described in detail below.

The environment 100 of FIG. 1 operates as follows. The existing client(s) 105 are observed communicating with endpoint(s) 111A, 111B, . . . 111N via the message monitor 125, for example, in a pre-processing or training stage. The client(s) 105 and the endpoint(s) 111A, 111B, . . . 111N may communicate via a network 120 using a communications mode or protocol, such as Lightweight Directory Access Protocol (LDAP) messages or Simple Object Access Protocol (SOAP) messages, which may be conveyed using Hypertext Transport Protocol (HTTP) with an Extensible Markup Language (XML) serialization. The message monitor 125 may include or implement a network monitoring tool, such as Wireshark®, and records messages communicated between (i.e., to and/or from) the client(s) 105 and the endpoint(s) 111A, 111B, . . . 111N. The message monitor 125 stores these messages in the message library 130.

The messages communicated between the client(s) 105 and the endpoint(s) 111A, 111B, . . . 111N may include requests only, request-response pairs, or a sequence of requests/responses for a particular operation. The sampled request messages and/or response messages communicated stored in the message library 130 may each contain two types of information: (i) protocol structure information (such as the operation name), used to describe software services behaviors; and (ii) payload information, used to express software systems' attributes. However, the message monitor 125 may record the messages without knowledge of the protocol, operation name, and/or attributes thereof.

For a given endpoint, a number of messages communicated thereto from the client(s) 105 are recorded by the message monitor 125. The recorded messages may thus include multiple messages of different operation types. As such, the collection of sampled messages communicated with a particular endpoint 111A, 111B, . . . , or 111N may be indicative of the specific communications protocol used by that endpoint. In particular, the repeated occurrence of information among sections of the sampled messages may indicate that these sections correspond to protocol structure for a particular operation type defined in the protocol specification. In contrast, variability among sections of the sampled messages may indicate that these sections include payload information, which is typically diverse according to various interaction operation parameter values.

Message analysis of the messages stored in the library 130 by the message analyzer 128 may thus be used to distinguish protocol-related information (indicated by relatively constant sections of the message structure) from application-specific information (indicated by variable sections of the message structure) by comparing sections of similar messages, without prior knowledge of the particular protocol used in the message transaction with the target endpoint. In embodiments of the present disclosure, one or more algorithms may be used to classify large numbers of stored messages (e.g., thousands or even millions) into groups or clusters of similar messages, which may assist and/or reduce the processing burden in creating request templates (also referred to herein as request prototypes) for each observed operation type. At a high level, these algorithms can be viewed as an application of clustering and sequence alignment techniques for inferring message structure information. For example, the message analyzer 128 may be configured to align the messages from the message library 130 in a manner suitable for comparison of characters, byte positions, n-grams, and/or other portions thereof, in order to group the messages by operation type and determine messages structures for each operation type based on commonalities among the messages of each group as described herein.

The message library 130 thus provides historical message transaction data that is used for training the universal connector server 115 to learn the message structures of the operation types used by one or more of the target endpoints 111A, 111B, . . . 111N. The training process may be applied not only for each type of endpoint, but also for alternative configurations of endpoints, particularly where the configuration is outside the previously observed training data. As described below, requests directed to new endpoint types may thereby be generated in accordance with the determined message structure used by a target endpoint for a particular operation type, without the need for additional coding and/or without prior knowledge of the protocols used by the new endpoint types.

As shown in FIG. 1, operation of the universal connector server 115 according to some embodiments is split into two stages, that is, the pre-processing or training stage and the run-time stage shown in FIG. 1. At the pre-processing stage, the message analyzer 128 is used to partition the message library 130 into groups or "clusters" of messages of a same operation type, for instance, as specified by user input or as determined using a data clustering method. Any clustering method may be used, such as the Visual Assessment of cluster Tendency (VAT), Bond Energy Algorithm (BEA), K-Means, a hierarchical clustering algorithm, etc. The clustering method may include human supervision (such as in VAT) or may be fully automated in some embodiments. The similarity may be determined by a distance function (such as the Needleman-Wunsch sequence alignment algorithm). The distance function may be applied to cluster the messages based on request similarity, response similarity, or a combination of request and response similarities.

The message analyzer 128 is further configured to determine, for the respective operation types, respective message structures used by the target endpoint based on commonalities among the ones of the messages of the respective groups corresponding thereto. In particular, the message analyzer 128 may use a multiple sequence alignment algorithm to align the request messages of each group according to respective positions thereof to identify constant and variable sections of the request message structure for the operation type corresponding thereto, based on a frequency of occurrence of common characters at the respective positions of the aligned requests.

The prototype generator 150 is configured to generate request templates (referred to herein as request prototypes) for each of the message clusters, including fields representing the constant and variable sections for each of the operation types. The fields of a request prototype representing the constant sections of a request message structure may include common patterns or characters among the request messages of the corresponding cluster/group. For example, responsive to multiple sequence alignment of the request messages of a group, the prototype generator 150 may select the most commonly occurring byte/character/substrings at each position for inclusion in a corresponding constant section of the request prototype, provided the byte/character/ substring has a relative frequency above a predetermined threshold. The request prototype may thus include a particular byte/character/substring at a particular position when there is a consensus (among the requests of the corresponding cluster/group) as to the commonality of the byte/character/substring at that position), while positions for which there is no consensus may be represented as a gap in the request prototype. The fields of a request prototype representing the variable sections of a request message structure may be populated by the request generator 160 at run-time.

At run-time, responsive to receiving a request $Req_{in}$ from the identity manager application server 101 at the virtual directory 112, the request generator 160 is configured to synthesize or otherwise generate a request message $Req_{out}A$, $Req_{out}B$ ..., or $Req_{out}N$ to a corresponding one of the target endpoints 111A, 111B, ..., or 111N by selecting one of the request prototypes having the same operation type (e.g., Add, Delete, Modify, etc.) as the request $Req_{in}$ and substituting corresponding values from the request $Req_{in}$ into one or more of the variable fields of the selected request prototype. The request generation 160 may thereby generate a request $Req_{out}A$, $Req_{out}B$ ..., or $Req_{out}N$ of the desired operation type in the format expected by a particular one of the target endpoints 111A, 111B ... or 111N, without additional coding or otherwise independent of knowledge indicating the communications protocol(s) used by the target endpoint.

It will be appreciated that in accordance with various embodiments of the present disclosure, the universal connector server 115 may be implemented in a single server, separate servers, or a network of servers (physical and/or virtual), which may be co-located in a server farm or located in different geographic regions. In other words, a universal connector as described herein may be run as an on-premise component, and/or in the cloud as software as a service (SaaS). The SaaS implementation may offer a RESTful API to access the functionality of the universal connector for both the training phase and the run-time phase. The endpoints 111A-111N may likewise include a single server, separate servers, or a network of servers (physical and/or virtual). As such, one or more of the client(s) 105, the endpoints 111A-111N, and the universal connector 115 may be co-located or remotely located, and communicatively coupled by one or more networks 120. The network 120 may be a global network, such as the Internet or other publicly accessible network. Various elements of the network 120 may be interconnected by a wide area network (WAN), a local area network (LAN), an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks. More generally, although FIG. 1 illustrates an example of a computing environment 100, it will be understood that embodiments of the present disclosure are not limited to such a configuration, but are intended to encompass any configuration capable of carrying out the operations described herein.

Figure 2:
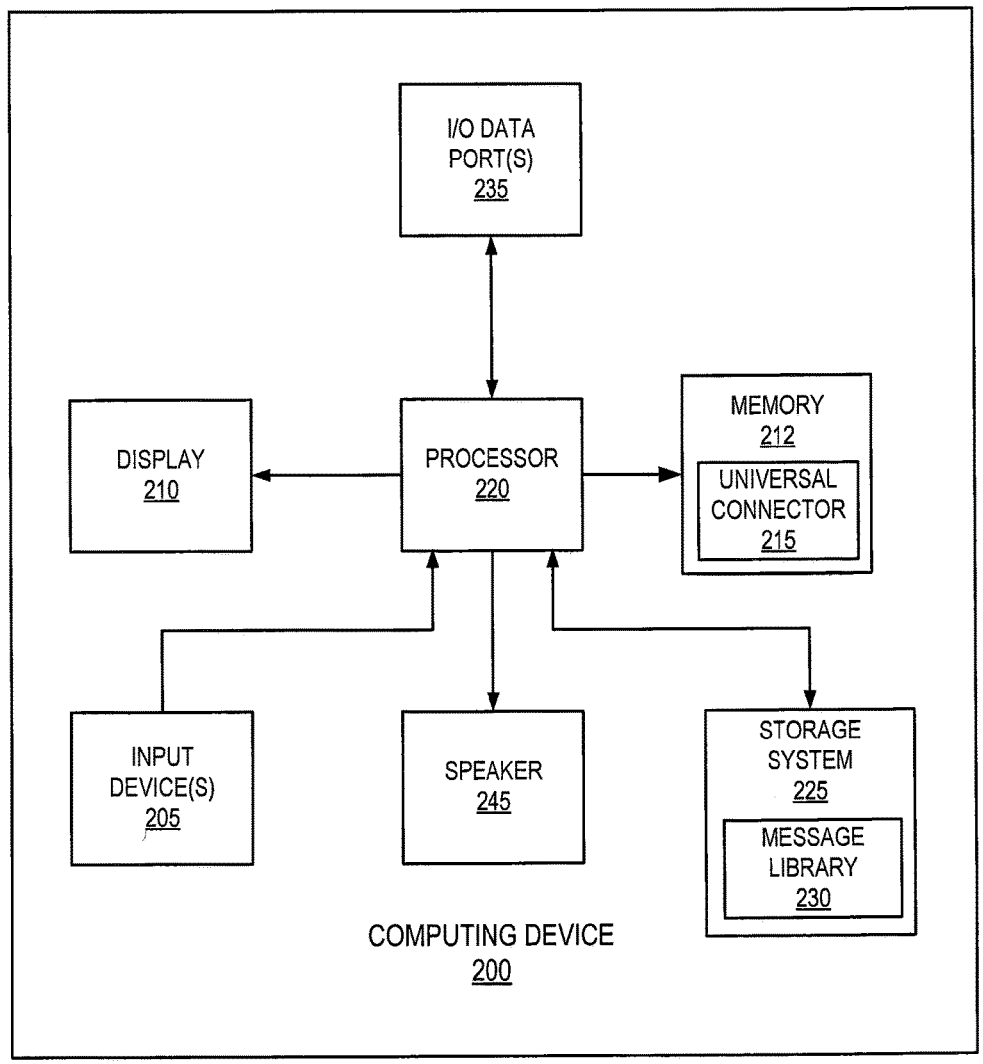
FIG. 2 is a block diagram that illustrates computing device implementation of a universal connector in accordance with some embodiments of the present disclosure

FIG. 2 illustrates an example computing device 200 in accordance with some embodiments of the present disclosure. The device 200 may be used, for example, to implement the universal connector server 115 in the system 100 of FIG. 1 using hardware, software implemented with hardware, firmware, tangible computer-readable storage media having instructions stored thereon, or a combination thereof, and may be implemented in one or more computer systems or other processing systems. The computing device 200 may also be a virtualized instance of a computer. As such, the devices and methods described herein may be embodied in any combination of hardware and software.

As shown in FIG. 2, the computing device 200 may include input device(s) 205, such as a keyboard or keypad, a display 210, and a memory 212 that communicates with one or more processors 220 (generally referred to herein as "a processor"). The computing device 200 may further include a storage system 225, a speaker 245, and I/O data port(s) 235 that also communicate with the processor 220. The memory 212 may include a computer readable program code implementing a universal connector 215 stored therein. The universal connector 240 may be configured to determine message structure(s) of a communications protocol or client library used by a target system/endpoint by analyzing messages communicated between the target system/endpoint and an existing client and generate requests to the target system/endpoint according to the determined message structure(s), as described in detail herein.

The storage system 225 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The storage system 225 may include a message library 230 storing data (including but not limited to requests and/or associated responses) communicated between a target system/endpoint and an existing client. Although illustrated in separate blocks, the memory 212 and the storage system 225 may be implemented by a same storage medium in some embodiments. The input/output (I/O) data port(s) 235 may include a communication interface and may be used to transfer information in the form of signals between the computing device 200 and another computer system or a network (e.g., the Internet). The communication interface may include a modem, a network interface (such as an Ethernet card), a communications port, a PCMCIA slot and card, or the like. These components may be conventional components, such as those used in many conventional computing devices, and their functionality, with respect to conventional operations, is generally known to those skilled in the art. Communication infrastructure between the components of FIG. 2 may include one or more device interconnection buses such as Ethernet, Peripheral Component Interconnect (PCI), and the like.

In embodiments of the present disclosure, the universal connector 215 is configured to record and analyze observable messages communicated between an existing client and a desired or target system/endpoint, and to infer information regarding the protocol specification and/or client libraries used by the endpoint, particularly in terms of the message structure(s) of the messages used in communication with the target endpoint. In particular, the universal connector 215 may be configured to pre-process the messages stored in the message library 230 to provide insight into the constant and variable sections of the message structures (as well as encoding rules in some embodiments) for the protocol(s) used by the target endpoint for each operation type. For example, message analysis may be used by the universal connector 215 to cluster or group the messages stored in the library 230 by operation type, and to distinguish, for each operation type, the constant sections of the message structure (which may include protocol-related information) from the variable sections of the message structure (which may include application-specific or payload information) with no prior knowledge of the particular communications protocol used by the target endpoint. In some embodiments, information regarding the operation types and/or fields of the messages stored in the library 230 may be received or otherwise specified via user input for cluster/group generation.

In some embodiments, one or more distance functions may be used by the universal connector 215 to indirectly identify similar ones of the stored requests and/or responses (for cluster/group generation) and/or to identify common features among the requests in a cluster/group (for request prototype generation). One notion of similarity that may be used in some embodiments of the present disclosure is the edit distance between two sequences, which indicates the minimum number of modifications (insertions, deletions, and/or substitutions) in order to obtain one sequence from the other. That is, the distance function may be used to compute the number of modifications or alterations among the stored requests or responses (such that ones having similar or lowest relative distances can be clustered in the same group), and/or to compute the frequency of occurrence of common characters among the requests of a group at respective character positions (such that frequently occurring characters can be included in a request prototype). In some embodiments, different distance functions may be automatically selected for cluster/group generation and request prototype generation, for example, based on a particular notion of similarity.

Using the generated request prototypes, a translation function may be used by the universal connector 215 at run-time to generate or synthesize a request of a specific operation type in accordance with the communications protocol expected by the target system/endpoint. As both the protocol-related information (indicated by the constant sections) and the application-related information (i.e., the variable sections) of the message structure may be distinguished by the pre-processing and/or distance calculations discussed above, the translation function may be configured to automatically generate requests to the target endpoint in the expected format by filling-in contents of the variable section(s) of a request prototype corresponding to a specified operation type using field substitution as described herein.

Figure 3:
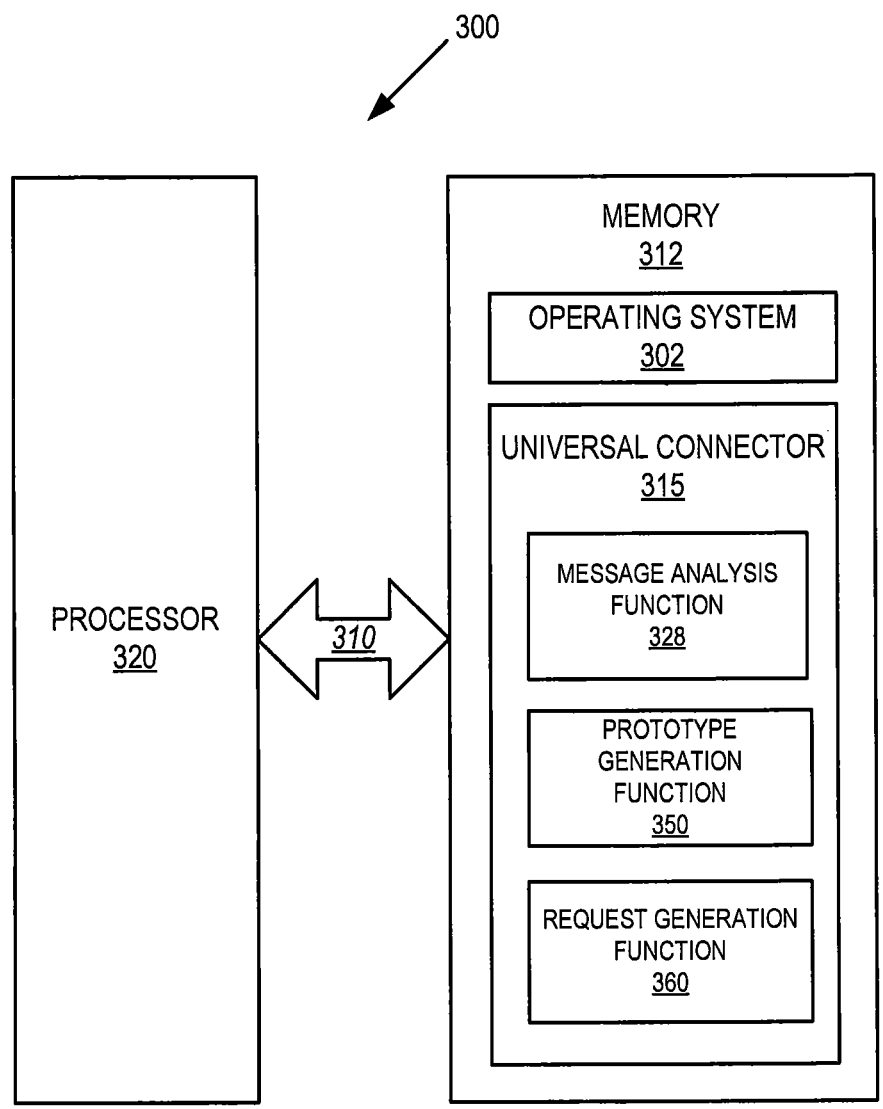
FIG. 3 is a block diagram that illustrates a software/hardware architecture for a universal connector in accordance with some embodiments of the present disclosure.

FIG. 3 illustrates a computing system or environment for providing connector services for protocol-independent endpoint management in accordance with further embodiments of the present disclosure. In particular, FIG. 3 illustrates a processor 320 and memory 312 that may be used in computing devices or other data processing systems, such as the computing device 200 of FIG. 2 and/or the universal connector server 115 of FIG. 1. The processor 320 communicates with the memory 312 via an address/data bus 310. The processor 320 may be, for example, a commercially available or custom microprocessor, including, but not limited to, digital signal processor (DSP), field programmable gate array (FPGA), application specific integrated circuit (ASIC), and multi-core processors. The memory 312 may be a local storage medium representative of the one or more memory devices containing software and data in accordance with some embodiments of the present disclosure. The memory 312 may include, but is not limited to, the following types of devices: cache, ROM, PROM, EPROM, EEPROM, flash, SRAM, and DRAM.

As shown in FIG. 3, the memory 312 may contain multiple categories of software and/or data installed therein, including (but not limited to) an operating system block 302 and a universal connector block 315. The operating system 302 generally controls the operation of the computing device or data processing system. In particular, the operating system 302 may manage software and/or hardware resources and may coordinate execution of programs by the processor 320, for example, in providing the identity management operations illustrated in FIG. 1.

The universal connector block 315 is configured to carry out some or all of the functionality of the message analyzer 128, the prototype generator 150, and the request generator 160 of FIG. 1. In particular, the universal connector block 315 includes a message analysis function 328, a prototype generation function 350, and a response generation function 360.

Responsive to accessing a message library (such as the message library 130 of FIG. 1) including a set of messages (e.g., requests and/or associated responses) communicated between a client (such as the client 105 of FIG. 1) and a target endpoint (such as one of the endpoints 111A . . . 111N of FIG. 1), the message analysis function 328 groups or "clusters" similar ones of the messages to partition the message library into groupings of messages having a same operation type for a particular target endpoint, a particular type of target endpoint, and/or alternative configurations thereof. The similarity can be determined using one or more distance measures or functions (such as the Needleman-Wunsch sequence alignment algorithm), or may be determined responsive to receiving user input indicative of the operation types of the messages stored in the library.

Based on the groupings or clusters of messages, the message analysis function 328 further determines the message structures used by the particular target endpoint for each of the operation types, based on the commonalities among the ones of the messages of the respective groups. In particular, the message analysis function 328 may align corresponding sections or positions of the request messages of each group, and may infer or otherwise identify constant and variable sections of the request message structure for each group of messages based on whether a frequency of occurrence of the characters at the corresponding sections or positions of the aligned requests exceeds a predefined threshold.

The prototype generation function 350 generates a request prototype for each group of messages (and thus, each operation type in the embodiment of FIG. 3), where each request prototype includes fields representing the constant and variable sections of the respective message structures of the corresponding group of messages. The prototype generation function 350 may generate the request prototype for a particular operation type to include the common characters of the requests in the corresponding cluster/group in the fields representing the constant sections identified by the message analysis function 328, while the fields representing the variable sections may be populated at run-time by the request generator 160. For example, the prototype generation function 350 may generate a request prototype to include a particular byte, character, or substring of characters at particular constant fields thereof based on a frequency of occurrence in respective positions of the requests of each cluster/group, as indicated by the message analysis function 328.

In some embodiments, the message analysis function 328 may use a frequency table to identify the byte/character/substring which occur at respective positions in more than a predetermined percentage of the requests in a cluster/group. To calculate the frequency table, request messages in the cluster/group may be aligned, for example, using a multiple sequence alignment algorithm (such as CLUSTALW). After completing a multiple sequence alignment, the most commonly occurring byte/character/substrings at each position may be selected for inclusion in a corresponding constant section of the request prototype by the prototype generation function 350, provided the byte/character/substring has a relative frequency above a predetermined threshold. In other words, the prototype generation function 350 may generate a request prototype to include a particular byte/character/substring at a particular position when there is a consensus (among the requests of the corresponding cluster/group) as to the commonality of the byte/character/substring at that position). Positions for which there is no consensus may be left as a gap in the request prototype.

It will be understood that these and/or other operations of the message analysis function 328 and the prototype generation function 350 may be performed as a pre-processing step, prior to any response generation. Also, as noted above, the distance function utilized for response prototype generation may be the same as or different than the distance function used during cluster/group generation. However the distance function utilized for response prototype generation may only compare the requests of each group, while the distance function used during cluster/group generation may compare information from the stored requests and/or the responses in order to cluster the messages into the respective groups.

Still referring to FIG. 3, at run-time, the request generation function 360 performs request generation by selecting one of the request prototypes corresponding to a desired operation type, and populating one or more of the variable fields of the selected request prototype. For example, the request generation function 360 may receive a request from a virtual directory (such as the virtual directory 112), may select one of the request prototypes having the same operation type as the virtual directory's request, and may substitute corresponding values/attributes from the virtual directory's request into one or more of the variable fields of the selected request prototype. The request generation function 360 may thereby generate a request of the desired operation type in the format expected by the target endpoint, independent of receiving data or other knowledge indicating the communications protocol(s) used by the target endpoint.

Although FIG. 3 illustrates example hardware/software architectures that may be used in a device, such as the computing device 200 of FIG. 2, to provide a universal connector in accordance with some embodiments described herein, it will be understood that the present disclosure is not limited to such a configuration but is intended to encompass any configuration capable of carrying out operations described herein. Moreover, the functionality of the computing device 200 of FIG. 2 and the hardware/software architecture of FIG. 3 may be implemented as a single processor system, a multi-processor system, a processing system with one or more cores, a distributed processing system, or even a network of stand-alone computer systems, in accordance with various embodiments.

Figure 4A:
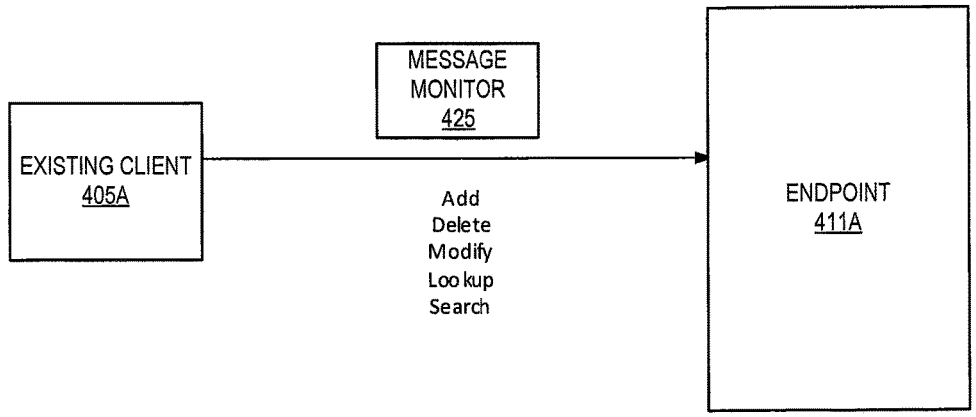
FIGS. 4A-4C are block diagrams illustrating operations performed by a universal connector in accordance with some embodiments of the present disclosure.
Figure 4B:
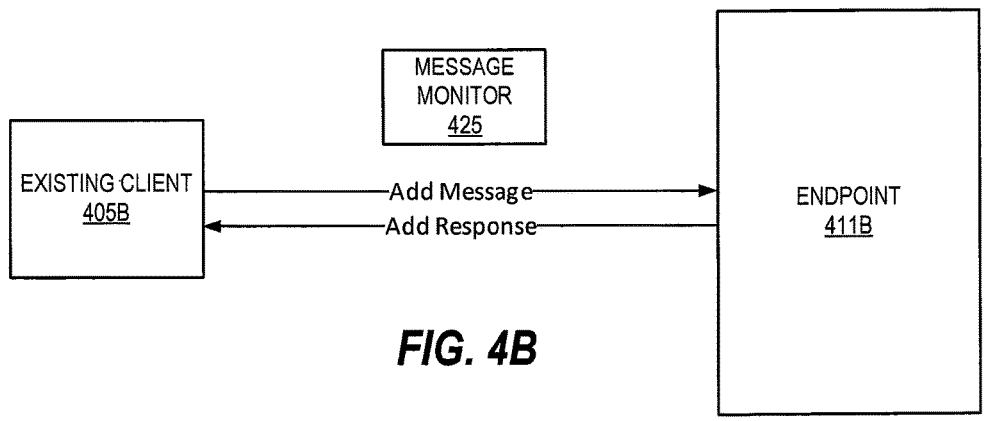
Figure 4C:
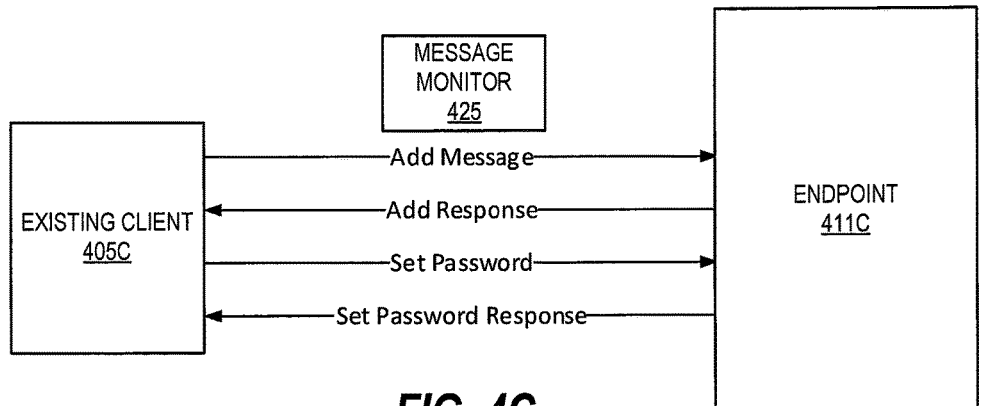

FIGS. 4A-4C are block diagrams illustrating operations performed by a universal connector in accordance with embodiments of the present disclosure to create a message library, such as the message library 130 of FIG. 1. As shown in FIGS. 4A-4C, the universal connector may be configured to support endpoint request operations including, but not limited to, Establish Connection (e.g. Login), Add, Delete, Modify, Lookup, Search, and/or Disconnect (e.g. Logout). To support these endpoint operations, a collection or database of previous messages communicated with the desired endpoint may be observed, recorded, and analyzed to determine the message structure for each operation.

In particular, as shown in FIGS. 4A-4C, this can be achieved by recording and storing traffic through a proxy mechanism, such as a message monitor 425. The message monitor 425 observes and stores messages for several operations transmitted from an existing client to a desired endpoint, and/or vice versa. For example, in FIG. 4A, the observed requests include Add, Delete, Modify, Lookup, and Search requests communicated from existing client 405A to endpoint 411A. In FIG. 4B, the observed protocol may include only a single request from existing client 405B, and the response thereto from endpoint 411B. In FIG. 4C, the observed protocol may involve several requests and responses, illustrated by way of example as an Add operation that includes separate message/responses communicated between existing client 405C and endpoint 411C to create a user and set a password.

Message recording may continue in order to store enough messages (of each operation type) to determine a message structure of the desired operation type(s). Once a sufficient number/amount of messages for each operation type is recorded, the universal connector can learn the protocol and/or otherwise determine the message structure for each operation type. Furthermore, based on a sufficient collection of messages, the universal connector can analyze and produce request templates for each operation type during the pre-processing stage, which can be subsequently populated by the universal connector at run-time to generate requests for each operation type. For example, for a particular endpoint several Add messages may be observed by the message monitor 425, such as:

```
<Add>
    <FirstName>John</FirstName>
    <LastName>Smith</LastName>
</Add>
<Add>
    <FirstName>Jane</FirstName>
    <LastName>Doe</LastName>
</Add>
```

By analyzing the message segments that change and mapping those to known attributes, the universal connector can generate a request template or prototype for the Add operation:

```
<Add>
    <FirstName>${FirstName}</FirstName>
    <LastName>${LastName}</LastName>
</Add>
```

While the above add request template or prototype is illustrated with reference to the XML format by way of example, embodiments of the present disclosure may similarly record and determine message structures for other textual formats (e.g., JSON) and/or binary formats (e.g., ASN.1, proprietary formats) as well.

Figure 5:
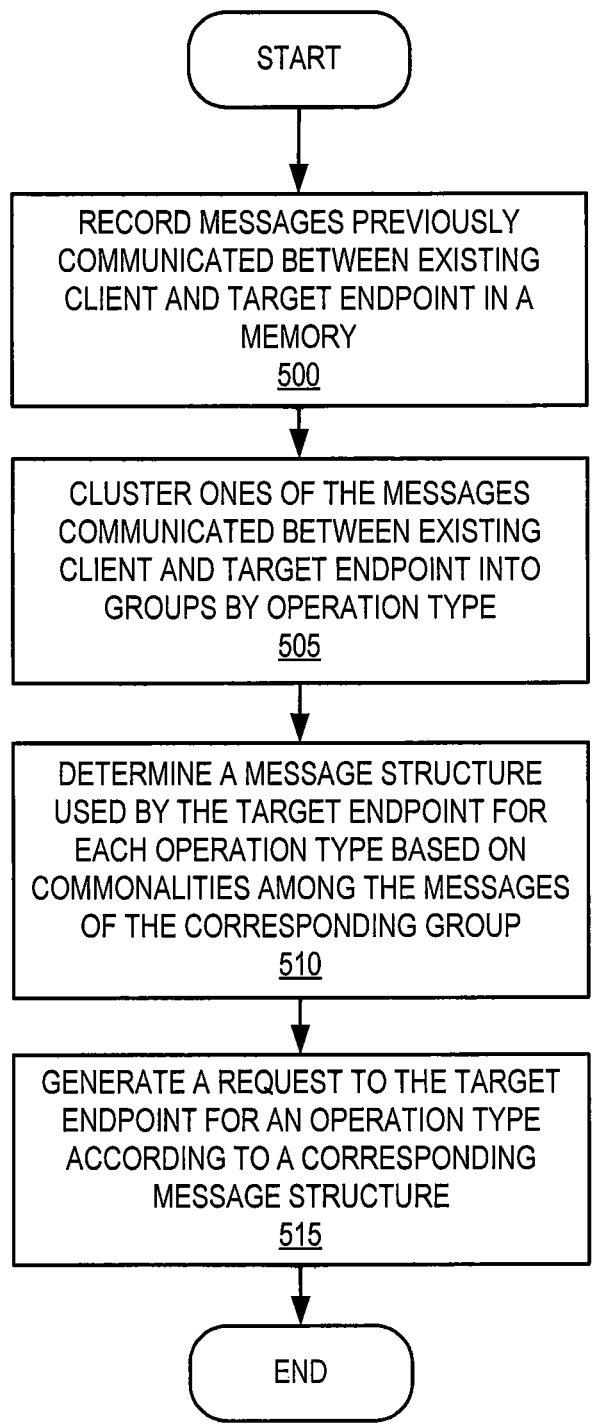
FIGS. 5 and 6A-6B are flowcharts illustrating methods of operation of a universal connector in accordance with some embodiments of the present disclosure.
Figure 6A:
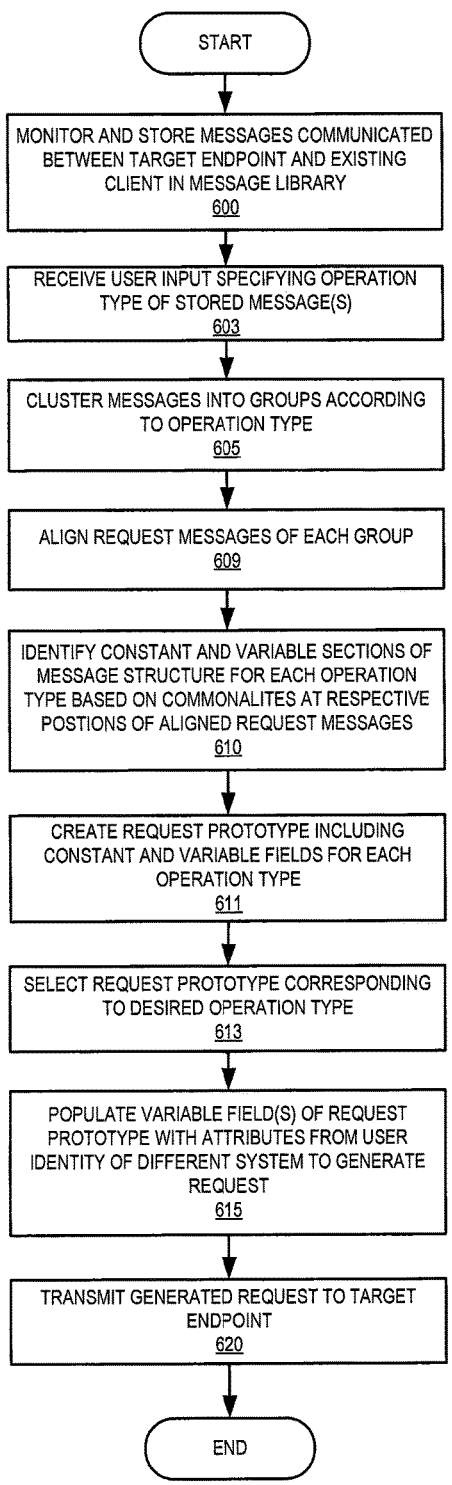
Figure 6B:
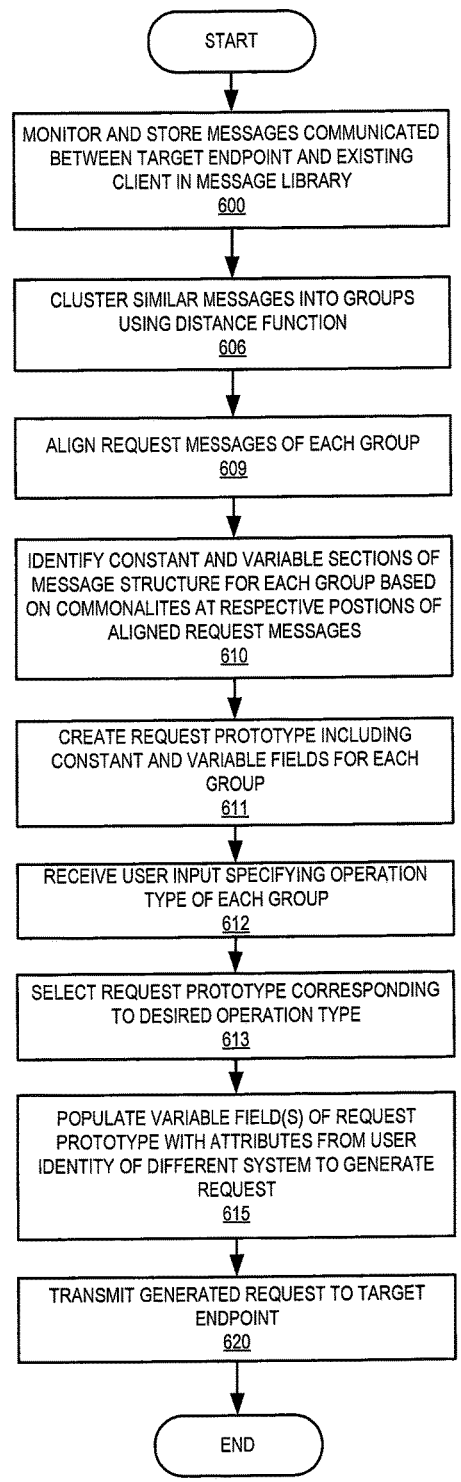

Operations for providing connector services for protocol-independent endpoint management in accordance with some embodiments of the present disclosure will now be described with reference to the flowcharts of FIGS. 5 and 6A-6B. FIG. 5 is a flowchart illustrating operations for training a universal connector to determine the message structure of a target endpoint in accordance with some embodiments of the present disclosure, while FIGS. 6A and 6B illustrate further operations for training a universal connector in accordance with embodiments of the present disclosure in greater detail. In some embodiments, the operations of FIGS. 5 and 6A-6B may be performed by the universal connector 115, 215, or 315 illustrated in FIGS. 1-3 or subcomponents thereof.

Referring now to FIG. 5, messages communicated between a target endpoint and an existing client thereof are recorded and stored in a computer readable memory at block 500. For example, the messages may include add requests, delete requests, and/or modify requests transmitted from a particular client to a particular target endpoint. In some embodiments, the messages may also include responses returned by the target endpoint responsive to receiving the requests from the client. The recording operations of block 500 may continue for a duration sufficient to record messages of multiple operation types communicated between the client and the target endpoint.

At block 505, ones of the messages previously communicated between the target endpoint and the existing client are clustered into respective groups. The respective groups may correspond to the operation types of the messages included therein, for the particular target endpoint or type thereof. For example, where the recorded messages include add requests, delete requests, and modify requests, the add requests may be clustered into a first group, the delete requests may be clustered into a second group, and the modify requests may be clustered into a third group. The clustering may be performed responsive to receiving a user input indicating the operation type of one or more of the messages, or may be performed using a distance function to calculate similarities among the recorded messages.

Based on commonalities among the messages of each group, a message structure used by the target endpoint for each of the operation types may be determined at block 510. For example, the add requests of the first group may be aligned according to respective positions thereof and analyzed to identify constant and variable sections of a message structure for the add request operation type, based on a frequency of occurrence of common characters at the respective positions of the aligned add requests. In some embodiments, a request prototype including fields representing the constant and variable sections may be created for each of the operation types. For instance, for the add request operation type, an add request prototype may be created, where the fields of the add request prototype representing the constant sections of the add message structure may include corresponding ones of the common characters indicated by the alignment of the add requests. A delete request prototype and a modify request prototype may be similarly created based on alignment of the delete requests and modify requests of the second and third groups discussed above, respectively.

At block 515, a request to the target endpoint for a desired one of the operation types may be generated according to the corresponding one of the message structures used by the target endpoint. In the above example, when it is desired to add a user identity to the target endpoint, the add request prototype may be selected from among the add, delete, and modify request prototypes, and the fields of the selected add request prototype corresponding to the variable sections of the add message structure may be populated with corresponding data from the user identity to generate the add request to the target endpoint. The generated request may thus be transmitted to the target endpoint, without knowledge or otherwise independent of the communications protocol(s) used by the target endpoint.

As discussed above, for each type of endpoint (for example, OpenLDAP or MySQL), as well as for alternative configurations of an endpoint (e.g., different schemas), the universal connector is trained to learn the message structure of the endpoint. A goal of the training is to infer how to translate fields from the virtual directory's schema to the target endpoint's message structure for each operation type. FIGS. 6A and 6B illustrate two alternative techniques for training the universal connector in accordance with embodiments of the present disclosure. The flowchart of FIG. 6A relies on some human input, while the flowchart of FIG. 6B is directed to unsupervised machine learning. In some embodiments, the training process may be applied not only for each type of endpoint, but also for alternative configurations of endpoints, particularly where the configuration is outside the previously observed training data.

Referring now to FIG. 6A, a human supervised method for training the universal connector in accordance with embodiments of the present disclosure can obtain input from the user regarding operation types and/or message field data sent during the message recording phase. In particular, after monitoring and recording messages communicated between a target endpoint and an existing client at block 600, user input specifying operation types of the stored messages is received at block 603. For example, in some embodiments, a user input tool may be provided, which may prompt a user for information about each message sent by the existing client during the message recording at block 600. For each message which is sent from the client, the user input tool may prompt the user to specify the operation type of the message (e.g. Add, Delete, Modify) and/or the data contained in the message fields in the context of the virtual directory's schema. For instance, if the virtual directory is using SCIM (System for Cross-domain Identity Management) as its schema, a traffic recorder (such as the message monitor 125 of FIG. 1) may observe the following message:

```
<Add>
    <FirstName>John</FirstName>
    <LastName>Smith</LastName>
</Add>
```

The user input tool may prompt the user to specify that (i) the message is of the "Add" operation type, (ii) the message contains the field "name:givenName" with the value "John", and (iii) the message contains the field "name:familyName" with the value "Smith". The user input tool may provide dropdown boxes, which can allow the user to map values within the sent message onto the virtual directory's schema. The user may also provide a sample of messages for each operation type with a range of values for each field.

Responsive to receiving the user input at block 603, the messages are clustered, based on the user-specified operation types, into respective groups corresponding to the respective operation types at block 605. The recorded messages in each group can be analyzed to extract the message structure for each operation type, for instance, by mapping the user input(s) onto the recorded messages sent by the client to the endpoint. In some embodiments, this may be accomplished by searching for the field values within the corresponding messages, and marking the bytes within the messages that correspond to the user input.

At block 609, request messages of each group are aligned according to respective positions or fields thereof. For example, a multiple sequence alignment algorithm (such as CLUSTALW) may be applied to the marked messages for each operation type, with a constraint that the user specified data fields within the messages are to be aligned. In some embodiments, this may be achieved by giving a relatively higher weighting to the alignment of these marked bytes.

Still referring to FIG. 6A, the format or structure of messages used by the target endpoint may be extracted or otherwise determined, for each operation type, from the aligned message sequences of each group. In particular, at block 610, constant and variable sections of the message structure for each operation type are identified based on commonalities at respective positions of the aligned request messages of each group. In some embodiments, the constant and variable sections may be inferred based on a frequency of occurrence of the commonalities at the respective positions of the requests of each group as indicated by the aligning at block 609, for example, using methods described in U.S. patent application Ser. No. 14/535,950 entitled "Systems and Methods for Automatically Generating Message Prototypes for Accurate and Efficient Opaque Service Emulation," filed Nov. 7, 2014, the disclosure of which is incorporated by reference herein in its entirety. In particular, after completing a multiple sequence alignment, a consensus may be calculated by selecting, at each byte (or character) position, the most commonly occurring byte or character at that position, provided the byte/character has a relative frequency of occurrence above a predetermined threshold. As such, at block 611, a request prototype including fields representing the identified constant and variable sections is created for each operation type. Each request prototype may include a particular byte/character at a particular position when there is a consensus (based on the frequency of occurrence among the messages of the corresponding group) as to the commonality of the byte/character at that position. In some embodiments, positions for which there is no consensus may be left as a gap in the corresponding request prototype.

At run-time, requests may be generated in a message format expected by the target endpoint based on the determined message structures and/or generated request prototypes. In particular, responsive to receiving a request from a virtual directory (such as the virtual directory 112 of FIG. 1) for a desired operation type, one of the request prototypes that corresponds to the desired operation type is selected at block 613. The fields of the selected request prototype that represent the variable sections of the corresponding message structure are populated with data from an external database to compose a request in accordance with a message structure used by the target endpoint at block 615. For example, values from the request that was received from the virtual directory may be substituted into corresponding positions of the request prototype for relevant ones of the fields that represent the variable sections of the corresponding message structure. The generated request is thus transmitted to the target endpoint at block 620.

Alternatively, referring to FIG. 6B, an unsupervised training method in accordance with embodiments of the present disclosure may allow for training of the universal connector for communication with a target endpoint without significant user input. In particular, at block 600, a sample of messages exchanged between a client and the target endpoint is monitored using a traffic recorder, such as the message monitor 125 of FIG. 1, and is recorded in a database, such as the message library 130 of FIG. 1. The recorded traffic contains a sample including multiple messages of different operation types. In general, a larger number of samples stored in the message library may allow for more effective training of the universal connector.

After recording and storing a sufficient set of sample messages at block 600, similar ones of the messages are automatically clustered into respective groups at block 606. A data clustering algorithm can be used to automatically group similar messages. Examples of clustering algorithms which may be used include K-Means, Hierarchical Clustering, a density based clustering algorithm, and/or a visual clustering algorithm such as VAT (Visual Assessment of cluster Tendency). Clustering algorithms may involve a distance function. An example of a distance function that may be used to cluster the messages is the Needleman-Wunsch sequence alignment algorithm. The distance function may be applied to only the request messages, only the response messages, or to pairs of request and response messages. Each group may thus include messages of the same operation type, based on the computed similarities of the messages therein.

Having clustered the messages into groups corresponding to respective operation types at block 606, common patterns for the request messages in each cluster may be identified. In particular, at block 609, the request messages of each group are aligned by respective positions thereof. For instance, a multiple sequence alignment algorithm may be applied to the request messages for each bluster, and format or structure of the messages of each group may be extracted or otherwise determined from the aligned request messages. In particular, at block 610, constant and variable sections of the message structure for each operation type are inferred or otherwise identified based on commonalities at respective positions of the aligned request messages of each group. In some embodiments, the constant and variable sections may be inferred based on a frequency of occurrence of the commonalities at the respective positions of the requests of each group as indicated by the aligning at block 609, for example, using methods described in U.S. patent application Ser. No. 14/535,950, as noted above.

At block 611, a request prototype including fields representing the identified constant and variable sections is created for each group. The fields of each request prototype representing the constant sections may be populated based on the frequency of occurrence of bytes/characters at respective positions of the requests of each group, while the fields of each request prototype representing the variable sections may be available for population with data from an external source, as discussed below.

Still referring to FIG. 6B, at block 612, a user input is received that specifies which cluster or group of messages corresponds to each operation type, thus indicating a correspondence between each request prototype and each operation type. In some embodiments, the received user input may further specify the mappings from the virtual directory's schema to the request fields for each operation type. For example, for each cluster or group, the received user input may specify not only the operation type (e.g. Add, Delete, etc), but may also map or otherwise indicate correspondence between fields of the virtual directory's schema to fields in the request. It will be understood that it may not be necessary to map all of the fields in the virtual directory's schema, as mapping of a subset of the fields may be sufficient in some embodiments.

In some embodiments, because the clusters/groups and/or the fields extracted from the recorded traffic may be unlabeled, automatically generated labels may be presented via a user interface to assist the user in the mapping process. For example, labels may be generated by numbering the clusters and fields, e.g., a cluster may be labelled as "Operation 1", "Operation 2", etc., and fields may be labelled "Field 1", "Field 2", etc. A more sophisticated labelling system may use heuristics to automatically label fields. The field length, the character contents, the field ordering, and/or other features may be used to probabilistically predict which fields in each request prototype correspond to a particular type or category of field. For example, if a field is 5 characters long and contains numeric values, it may be inferred that this field is a US ZIP code. If the field contains alphabetic characters, then depending on the length, it may be predicted that the field includes a given name or a family name.

However, it will be understood that receipt of the user input at block 612 may not be necessary in some embodiments of the present disclosure. In particular, in some embodiments, the user input of block 612 may be omitted, and the operation types of each cluster may be automatically inferred, for example, using heuristics based on the previously recorded messages.

At run-time, requests may be generated in a message format expected by the target endpoint based on the determined message structures and/or generated request prototypes. In particular, responsive to receiving a request from a virtual directory (such as the virtual directory 112 of FIG. 1) for a desired operation type, a corresponding one of the request prototypes is selected at block 613. The fields of the selected request prototype that represent the variable sections of the corresponding message structure is populated with data from an external database to compose a request in accordance with a message structure used by the target endpoint at block 615. For example, when a request to associate a user identity from a corporate store (such as the identity data store 110 of FIG. 1) with an account of the target endpoint is received, values from the virtual directory's request may be substituted into corresponding positions of the request prototype for relevant ones of the fields that represent the variable sections of the corresponding message structure. The generated request is thus transmitted to the target endpoint at block 620.

In some embodiments, the universal connector may include built-in (i.e., preprogrammed) knowledge of various encoding formats that may be used by a target endpoint, for improved accuracy. Example encoding formats include XML, JSON, ASN.1, etc. The user input received at block 603 or 612 may specify the encoding format of the recorded message in some embodiments, while in some other embodiments the encoding format of the recorded messages may be automatically detected. During the traffic analysis (training) phase, if the messages are encoded in a standard encoding format, then the messages may be initially decoded into a canonical format, before the remainder of the training phase is performed. During the run-time phase, requests can be encoded into the target endpoint's encoding format before being sent to the target endpoint at block 620. If the recorded messages are compressed or encrypted, decompression and/or decryption may be performed before the training phase. At the run-time phase, the generated requests may be similarly compressed and/or encrypted to conform to the target endpoint's specifications.

Aspects of the present disclosure have been described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. As used herein, "a processor" may refer to one or more processors.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Although some of the diagrams include arrows on communication paths to show a primary direction of communication, it is to be understood that communication may occur in the opposite direction to the depicted arrows. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" (and variants thereof) when used herein, specify the presence of stated features, integers, steps, operations, elements, and/or components, but do not preclude the presence or addition of one or more other features, integers, steps, operations, elements, components, and/or groups thereof. In contrast, the term "consisting of" (and variants thereof) when used in this specification, specifies the stated features, integers, steps, operations, elements, and/or components, and precludes additional features, integers, steps, operations, elements and/or components. Elements described as being "to" perform functions, acts and/or operations may be configured to or otherwise structured to do so. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the disclosure being set forth in the following claims.

The invention claimed is:

1. A computer-implemented method performed by a connector server communicatively coupled to a target endpoint device and a client device, the method comprising:
   recording, in a computer-readable memory of the universal connector server, a plurality of messages communicated between the target endpoint device and the client device;
   clustering, by at least one processor of the connector server, ones of the messages into respective groups of messages, wherein the respective groups of messages correspond to respective operation types of the ones of the messages included therein;
   determining, by the at least one processor, for the respective operation types, respective message structures used by the target endpoint device based on an identification of constant and variable sections of the respective message structures based on commonalities among the ones of the messages of the respective groups corresponding thereto and independent of a communications protocol used by the target endpoint device;
   creating, by the at least one processor, for the respective operation types, respective request prototypes comprising fields representing the constant and the variable sections of the respective message structures used by the target endpoint device for the respective operation types; and
   generating, by the at least one processor, for one of the respective operation types, a request to the target endpoint device using one of the respective request prototypes in accordance with a corresponding one of the respective message structures used by the target endpoint device,
   wherein the commonalities comprise common characters that are present at the respective positions of ones of the requests of the respective groups, and
   wherein, for the respective request prototypes, the fields representing the constant sections include corresponding ones of the common characters.

2. The method of claim 1, wherein the ones of the messages of the respective groups comprise requests to the target endpoint device, and wherein identifying the constant and variable sections of the respective message structures for the respective operation types further comprises:
   aligning, by the at least one processor, the requests of the respective groups according to respective positions thereof; and
   identifying, by the at least one processor, for the respective operation types, the constant and variable sections of the respective message structures based on a frequency of occurrence of the commonalities at the respective positions of the requests of the respective groups corresponding thereto indicated by the aligning.

3. The method of claim 1, wherein generating the request to the target endpoint device using the one of the respective request prototypes for the one of the respective operation types comprises:
   selecting, by the at least one processor, the one of the request prototypes corresponding to the one of the operation types; and
   for the one of the request prototypes, populating, by the at least one processor, ones of the fields representing the variable sections with data from an external database communicatively coupled to the connector server to generate the request to the target endpoint device.

4. The method of claim 3, wherein the data corresponds to a user identity in a communication system employing a message structure different from the respective message structures used by the target endpoint device, and wherein the request associates the user identity with an account of the target endpoint device.

5. The method of claim 1, wherein the clustering comprises:
   clustering, by the at least one processor, the ones of the messages into the respective groups responsive to receiving user input indicating the respective operation types of the ones of the messages.

6. The method of claim 1, wherein the clustering comprises:
  clustering, by the at least one processor, the ones of the messages into the respective groups based on similarities therebetween calculated using a distance function; and then
  classifying, by the at least one processor, the respective groups as corresponding to the respective operation types responsive to receiving user input indicative thereof.

7. A connector server system communicatively coupled to a target endpoint device and a client device, the connector server system comprising:
  a processor; and
  a memory coupled to the processor, the memory comprising computer readable program code embodied therein that, when executed by the processor, causes the processor to perform operations comprising:
    recording, in a computer-readable memory, a plurality of messages communicated between the target endpoint device and the client device;
    clustering ones of the messages into respective groups of messages, wherein the respective groups of messages correspond to respective operation types of the ones of the messages included therein;
    determining, by the at least one processor, for the respective operation types, respective message structures used by the target endpoint device based on an identification of constant and variable sections of the respective message structures based on commonalities among the ones of the messages of the respective groups corresponding thereto and independent of a communications protocol used by the target endpoint device;
    creating, by the at least one processor, for the respective operation types, respective request prototypes comprising fields representing the constant and the variable sections of the respective message structures used by the target endpoint device for the respective operation types; and
    generating, by the at least one processor, for one of the respective operation types, a request to the target endpoint device using one of the respective request prototypes in accordance with a corresponding one of the respective message structures used by the target endpoint device,
  wherein the commonalities comprise common characters that are present at the respective positions of ones of the requests of the respective groups, and
  wherein, for the respective request prototypes, the fields representing the constant sections include corresponding ones of the common characters.

8. The computer system of claim 7, wherein the ones of the messages of the respective groups comprise requests to the target endpoint device, and wherein, in identifying the constant and variable sections of the respective message structures for the respective operation types, the computer readable program code further causes the processor to perform operations comprising:
  aligning the requests of the respective groups according to respective positions thereof; and
  identifying, for the respective operation types, the constant and variable sections of the respective message structures based on a frequency of occurrence of the commonalities at the respective positions of the requests of the respective groups corresponding thereto indicated by the aligning.

9. The computer system of claim 7, wherein, in generating the request to the target endpoint device for the one of the respective operation types, the computer readable program code further causes the processor to perform operations comprising:
  selecting one of the request prototypes corresponding to the one of the operation types; and
  for the one of the request prototypes, populating ones of the fields representing the variable sections with data from an external database communicatively coupled to the connector server to generate the request to the target endpoint device.

10. The computer system of claim 9, wherein the data corresponds to a user identity in a communication system employing a message structure different from the respective message structures used by the target endpoint device, and wherein the request associates the user identity with an account of the target the endpoint device.

11. A computer program product, comprising:
  a computer readable storage medium having computer readable program code embodied in the medium, the computer readable program code comprising:
    computer readable code to record, in a computer-readable memory of a connector server, a plurality of messages communicated between a target endpoint device and a client device, the connector server communicatively coupled to the target endpoint device and the client device;
    computer readable code to cluster ones of the messages into respective groups, wherein the respective groups of messages correspond to respective operation types of the ones of the messages included therein;
    computer readable code to determine, for the respective operation types, respective message structures used by the target endpoint device based on an identification of constant and variable sections of the respective message structures based on commonalities among the ones of the messages of the respective groups corresponding thereto and independent of a communications protocol used by the target endpoint device;
    computer readable code to create, for the respective operation types, respective request prototypes comprising fields representing constant and variable sections of the respective message structures used by the target endpoint device for the respective operation types; and
    computer readable code to generate, for one of the respective operation types, a request to the target endpoint device using one of the respective request prototypes in accordance with a corresponding one of the respective message structures used by the target endpoint device,
  wherein the commonalities comprise common characters that are present at the respective positions of ones of the requests of the respective groups, and
  wherein, for the respective request prototypes, the fields representing the constant sections include corresponding ones of the common characters.

12. The computer program product of claim 11, wherein the ones of the messages of the respective groups comprise requests to the target endpoint device, and wherein the computer readable code to identify the constant and variable sections of the respective message structures for the respective operation types further comprises:
  computer readable code to align the requests of the respective groups according to respective positions thereof; and
  computer readable code to identify, for the respective operation types, the constant and variable sections of the respective message structures based on a frequency of occurrence of the commonalities at the respective positions of the requests of the respective groups corresponding thereto indicated by the aligning.

13. The computer program product of claim 11, wherein the computer readable code to generate the request to the target endpoint device for the one of the respective operation types comprises:
  computer readable code to select one of the request prototypes corresponding to the one of the operation types; and
  computer readable code to populate, for the one of the request prototypes, ones of the fields representing the variable sections with data from an external database communicatively coupled to the connector server to generate the request to the target endpoint device.

14. The computer program product of claim 13, wherein the data corresponds to a user identity in a communication system employing a message structure different from the respective message structures used by the target endpoint device, and wherein the request associates the user identity with an account of the target the endpoint device.

* * * * *